Jan. 19, 1932.  F. FRASER  1,841,724
GLASS SURFACING APPARATUS
Filed Oct. 6, 1926
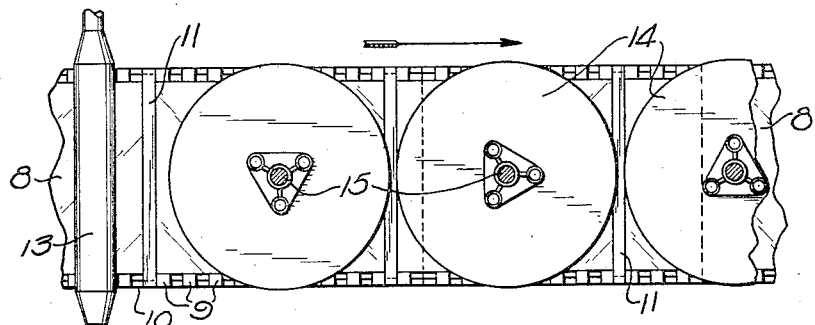
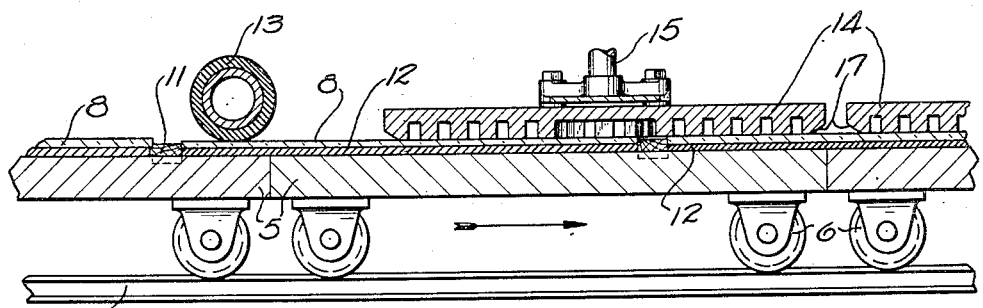
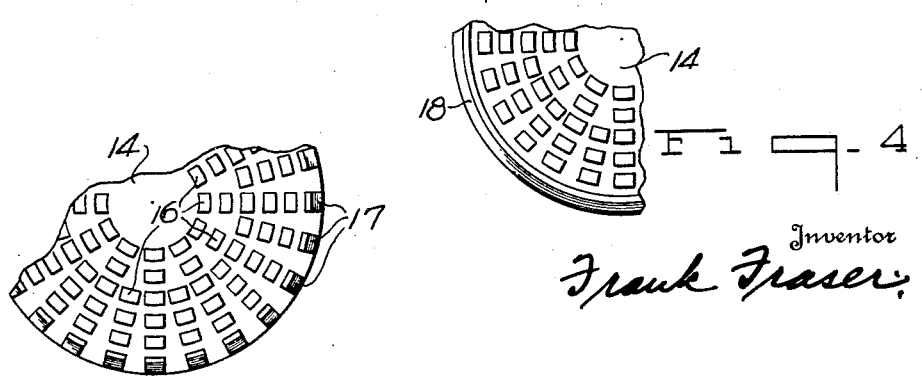
Inventor
Frank Fraser Patented Jan. 19, 1932

1,841,724

UNITED STATES PATENT OFFICE

FRANK FRASER, OF TOLEDO, OHIO, ASSIGNOR TO LIBBEY-OWENS-FORD GLASS COMPANY, OF TOLEDO, OHIO, A CORPORATION OF OHIO

GLASS SURFACING APPARATUS

Application filed October 6, 1926. Serial No. 139,816.

The present invention relates to sheet glass surfacing apparatus.

An important object of the invention is to provide in sheet glass apparatus means whereby a plurality of sheets of glass may be freely supported and passed continuously and progressively in contact with a plurality of surfacing units.

Another object of the invention is to provide in sheet glass apparatus a plurality of tables adapted to be coupled together to form a continuous surface, and including means whereby the continuous surface may be divided into a plurality of recesses in which may be freely supported sheets of glass, and including a surfacing element constructed to pass from one sheet to another during the surfacing thereof without injury to said sheets.

Still another object of the invention is to provide in sheet glass apparatus a plurality of tables adapted to be associated in operative relation, the tables having means for dividing the same into a plurality of recesses, each recess having a compressible pad therein, and upon which a sheet of glass may be freely supported, the tables being movable beneath a plurality of surfacing units having bevelled means whereby the surfacing unit may be passed from one sheet to another without injury thereto.

Another object of the invention is to provide in sheet glass surfacing apparatus means whereby varying thicknesses of sheets of glass may be surfaced, the sheets being supported upon compressible members adapted to compensate for variations in thickness, the sheets of glass being subjected to the action of surfacing units shaped to pass from one sheet to another without chipping or otherwise destroying the said sheets.

A still further object of the invention is to provide means for freely supporting a plurality of sheets of glass and to move the same continuously and progressively beneath a series of surfacing units, said supporting means being such that upper surfaces of all of the sheets can be arranged in substantially the same plane.

Other objects and advantages of the invention will become more apparent during the course of the following description.

In the drawings wherein like numerals are employed to designate like parts throughout the same, Fig. 1 is a top plan view illustrating diagrammatically the invention in use, Fig. 2 is a vertical longitudinal section therethrough, and Figs. 3 and 4 are fragmentary details of two types of surfacing units.

In the so-called continuous process it has been customary to join a plurality of tables in operative relation in a manner that a plurality of sheets of glass may be supported upon the tables after which they are moved in contact with a plurality of surfacing machines. The sheets of glass in the prior art have been held in position by means of plaster of Paris. The use of plaster of Paris entails considerable expense, one of the objections being that it is necessary to allow the plaster of Paris to set before the sheet of glass can be subjected to the action of a surfacing machine.

The present invention has for its object means whereby a plurality of sheets of glass can be freely and loosely supported in a suitable recess so that there is no need to cement or otherwise rigidly hold the sheets in position. It has been found that plate glass blanks are somewhat ununiform in their thickness, and it is therefore an aim of the present case to set forth a construction adapted to take care of the variations in thickness of plate glass blanks.

The numeral 5 designates one of a plurality of tables supported on the wheels 6 adapted to be moved along the tracks 7. The tables are constructed in a manner that they can be operatively connected to form a continuous surface. The sheets of glass 8 are freely supported in recesses, and it is to be understood that the invention is not limited to any particular type of recess. For the sake of convenience, a form of recess is illustrated and is created by providing upstanding lugs 9 along the edges of the tables, the lugs forming grooves 10 therebetween. Transverse members or strips 11 are adapted to be arranged in the grooves 10 so that the table or tables can be divided into any number of recesses of any desired lengths. Arranged in each recess is a compressible pad 12. The pad 12 is of rubber, cork, felt or some similar material. The pad may also be passed under the strips 11, if desired. Illustrated in an exaggerated manner in Fig. 2 are glass sheets of varying thickness. As clearly shown a roll 13 is preferably mounted transversely of the sheets of glass 8. The tables are moving in the direction of the arrow so that the sheets contact with the roll 13 before contacting with the surfacing units 14. The roll is preferably formed from a compressible material.

The numerals 14 designate the grinding heads against which the sheets move. The grinding heads are supported on rotatable spindles 15, and include a plurality of flat teeth or projections 16 clearly shown in Figs. 3 and 4. The projections are ordinarily formed from cast iron, and together with the action of suitable abrasives, surface a sheet of glass coming in contact therewith. As clearly shown in Fig. 3, the outer row of projections 16 are bevelled as at 17. In Fig. 4 a continuous bevelled face 18 is provided instead of a plurality of lugs.

The bevelled surfaces 17 or 18 are provided to permit the grinding head to ride or pass from one sheet of glass to another without breakage as the bevelled surface will readily ride upon a sheet standing a little higher than its preceding sheet without breakage. After the head has once passed upon a sheet it will be pressed, if necessary, to a common level so that the upper surface of all of the sheets while being ground will be substantially in a common plane due to the fact that the compressible pads will take care of the variations in thickness. Thus, a plurality of sheets of glass of varying thicknesses can be freely supported in recesses on a movable table, each sheet having arranged therebeneath a compressible pad member. As has been pointed out, the pads will take care of the variations in thickness of said sheets, while the bevelled faces 17 and 18 will permit the surfacing units to readily pass from one sheet to another. The compressible roll 13 will assist in arranging all of the sheets in a common plane.

Of course the sheets of glass are not purposely made in varying thicknesses, but on the other hand these variations seem unavoidable in the manufacture of the blanks. Although the use of the roll 13 is preferable, its use is not necessarily imperative.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

Claims:

1. In sheet glass surfacing apparatus, means for supporting a plurality of sheets of glass, and a plurality of surfacing members, said supporting means being compressible so that the weight of the surfacing members will make the sheets of glass seek substantially a common plane.

2. In sheet glass surfacing apparatus, means for loosely supporting a plurality of sheets of glass including moving tables, a plurality of surfacing units, the sheets of glass contacting with the units to be surfaced, and compressible means under each sheet so that the surfaces of the sheets contacting with the surfacing units can be forced to substantially a common plane by the weight of said units.

3. In sheet glass surfacing apparatus, a plurality of surfacing units, means for continuously and progressively passing sheets of glass in contact therewith, a compressible member arranged under each sheet for freely supporting the same whereby the surfaces of all of the sheets contacting with the surfacing units may be forced downwardly thereby to substantially a common plane.

4. In apparatus for surfacing sheet glass, a plurality of tables positioned end to end and movable in a horizontal path, said tables having recesses in their upper surfaces arranged in a common plane, compressible pads disposed within said recesses and upon which the glass sheets are adapted to be mounted, and a plurality of surfacing units adapted to engage the glass, the weight of said units acting to force the sheets downwardly to substantially a common plane.

5. In apparatus for surfacing sheet glass, a plurality of tables positioned end to end and movable in a horizontal path, said tables having recesses in their upper surfaces arranged in a common plane, compressible pads disposed within said recesses and upon which the glass sheets are adapted to be mounted, and a plurality of surfacing units adapted to engage the glass, each unit having an inclined surface to allow the same to ride up on a sheet of glass arranged in a slightly higher plane than the preceding sheet, and the said surfacing units acting to force the sheets downwardly to substantially a common plane.

6. In apparatus for surfacing sheet glass, a plurality of tables positioned end to end and movable in a horizontal path, said tables having recesses in their upper surfaces arranged in a common plane, compressible pads disposed within said recesses and upon which the glass sheets are adapted to be mounted, a plurality of surfacing units adapted to engage the glass, the weight of said units acting to force the sheets downwardly to substantially a common plane, and a roll extending transversely of the tables and adapted to engage the rear end of each sheet as the forward end thereof moves beneath and in contact with the surfacing unit.

7. In apparatus for surfacing sheet glass, a plurality of tables positioned end to end and movable in a horizontal path, said tables having recesses in their upper surfaces arranged in a common plane, compressible pads disposed within said recesses and upon which the glass sheets are adapted to be mounted, a plurality of surfacing units adapted to engage the glass, each unit having an inclined surface to allow the same to ride up on a sheet of glass arranged in a slightly higher plane than the preceding sheet, and the said surfacing units acting to force the sheets downwardly to substantially a common plane, and a roll extending transversely of the tables and adapted to engage the rear end of each sheet as the forward end thereof moves beneath and in contact with the surfacing unit.

8. In apparatus for surfacing sheet glass, a plurality of tables positioned end to end and movable in a horizontal path, said tables having recesses in their upper surfaces arranged in a common plane, compressible pads disposed within said recesses and upon which are adapted to be mounted glass sheets of varying thicknesses, and a plurality of surfacing units adapted to engage the glass, the weight of said units acting to force the said sheets of varying thicknesses to substantially a common plane.

Signed at Toledo, in the county of Lucas and State of Ohio, this 2nd day of October 1926.

FRANK FRASER.